Oct. 14, 1969 P. D. CAMPBELL Re. 26,693

EVAPORATOR FOR ICE MACHINES

Original Filed Dec. 13, 1965

INVENTOR
Paul D. Campbell
BY
Wofford & Felsman
ATTORNEYS

United States Patent Office

Re. 26,693
Reissued Oct. 14, 1969

26,693

EVAPORATOR FOR ICE MACHINES

Paul D. Campbell, P.O. Box 222, Longview, Tex. 75601

Original No. 3,327,494, dated June 27, 1967, Ser. No. 599,118, Dec. 5, 1966, which is a continuation of application Ser. No. 513,907, Dec. 13, 1965. Application for reissue June 11, 1968, Ser. No. 741,814

Int. Cl. F25c *5/10;* F25b *39/02*

U.S. Cl. 62—352 6 Claims

Matter enclosed in heavy brackets [ ] appears in the original patent but forms no part of this reissue specification; matter printed in italics indicates the additions made by reissue.

*ABSTRACT OF THE DISCLOSURE*

*A vertical column type evaporator for ice manufacture having separate refrigerant and hot gas lines extending to the bottom region of the evaporator and a suction line at the top region. For optimum performance a deflection element is carried by the hot gas line to direct hot gas against opposite sides of the lower end of the refrigerant line.*

This is a continuation of my copending application Ser. No. 513,907, filed Dec. 13, 1965, now abandoned. [My invention relates to ice manufacturing machines in general, and in particular to improvements in column type evaporators for such machines.]

Following is a disclosure of an evaporator for use in the manufacture of ice. This evaporator is of the common type having inner and outer tubular members that form an evaporator chamber. Water is sprayed onto the interior and exterior exposed surfaces of the tubular members and the temperature reduced to form ice. A refrigerant line extends through the evaporator chamber, and expansion of the refrigerant within the chamber effects the above temperature reduction during a freezing cycle. A hot gas line also extends through the evaporator chamber to raise the temperature of the tubular members during an ice harvest cycle. A hot gas deflection element is utilized on the end of the hot gas line to direct the flow of the hot gas against opposite sides of a discharge end portion of the refrigerant line to limit the build-up of ice in this region of the evaporator during the ice manufacturing cycle.

Previously, methods and apparatus have been developed for harvesting ice from column type evaporators in which a gas such as Freon is utilized as a refrigerant. The gas, after passing through a heat exchanger and compressor, enters a chamber or void between two concentric tubular members or pipes. This chamber is sealed at both ends, thus forcing the refrigerant gas to enter or exit the chamber only at the two designated locations. Simultaneously as the gas is discharged into the chamber and while expanding therein, water is introduced to the inner and outer exposed surfaces of the concentric tubular members and transformed into ice due to the heat absorption from the concentric tubular members occasioned by the expansion of the refrigerant gas. After the water is transformed into ice, the gas that has become a non-refrigerant through heat absorption is recirculated between the tubular members. This warms the surfaces of the tubular members and eventually enables the ice to be removed therefrom.

One disadvantage of previously known evaporators of the vertical column type is that their tubular members tend to cool excessively at the regions nearest the discharge of the refrigerant from the cold gas or refrigerant inlet. A relatively widespread temperature differential may occur on the surfaces of the tubular members, causing the formation of uneven ice thicknesses during the freezing cycle. Consequently, the ice becomes difficult to remove from the evaporator and produces something less than completely satisfactory results.

It is accordingly the general object of my invention to provide an improved column type evaporator for ice manufacturing machines.

Another object of my invention is to improve the ice harvest cycle in an ice manufacturing machine having a column type evaporator by utilization of the discharge of hot gas on the discharge end of the refrigerant line to facilitate formation of uniform ice thickness on the inner and outer tubular members of the evaporator.

*Another object of my invention is to provide in a vertical column evaporator for ice manufacturing separate refrigerant and hot gas lines that extend to a lower region of an annular chamber, and a gas outlet connected with an upper region of the chamber whereby the length of the refrigerant line communicates with hot gas during ice harvesting.*

These and other objects are effected by my invention as will be apparent from the following description taken in accordance with the accompanying drawing, forming a part of this application, in which.

Figure 4:
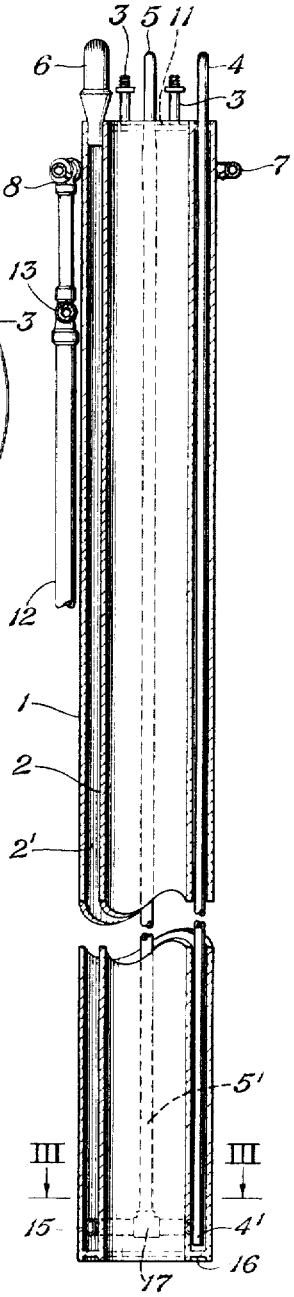
FIG. 4 is a longitudinal section view of the evaporator of FIGS. 1, 2, and 3 as seen looking along the lines IV—IV of FIG. 2.

The numeral 1 in the drawing designates an outer tubular member having an outer surface upon which ice is formed as will be explained subsequently, while the numeral 2 designates an inner tubular member disposed inside and being substantially co-extensive with the outer tubular member to define an elongated and sealed annular evaporator chamber 2' therebetween. Ice forms on the innermost surface of inner tubular member 1 as will become apparent hereinafter. A plurality of support studs 3 extend from the top of the evaporator for supporting it in a vertical position. A cold gas or refrigerant line 4 extends through the evaporator chamber between the inner and outer tubular members, having its discharge end portion 4' terminating in a lower region thereof as shown in FIG. 4. A hot gas line 5 also extends through the evaporator chamber, with its end portion 5' terminating at a region of the chamber adjacent the discharge end 4' of the refrigerant line 4. A gas outlet 6 is provided to enable recycling of the gas through the refrigeration system.

An exterior spray ring 7 having a multiplicity of inwardly directed spray nozzles 7' is provided to occasionally discharge water onto the exterior surface of the outer tubular member 1. Similarly, a spray head 10 having a plurality of outwardly directed spray nozzles 10' is provided on the interior of the inner tubular member 2 to enable the occasional discharge of water onto the interior surface of the inner tubular member 2. Water is fed into spray ring 7 through the spray ring connection 8 and into the spray head 10 through the conduit 9 which has its upper end extending over the upper surface of the inner and outer tubular members sealed by the use of a closure strip 11 to which is secured the support studs 3 and through which extend hot gas outlet 6, the hot gas inlet 5, and the cold gas inlet 4. Water is supplied to the ring connection 8 and to the conduit 9 through a reducing "T" 13 and a water header 12.

Figure 1:
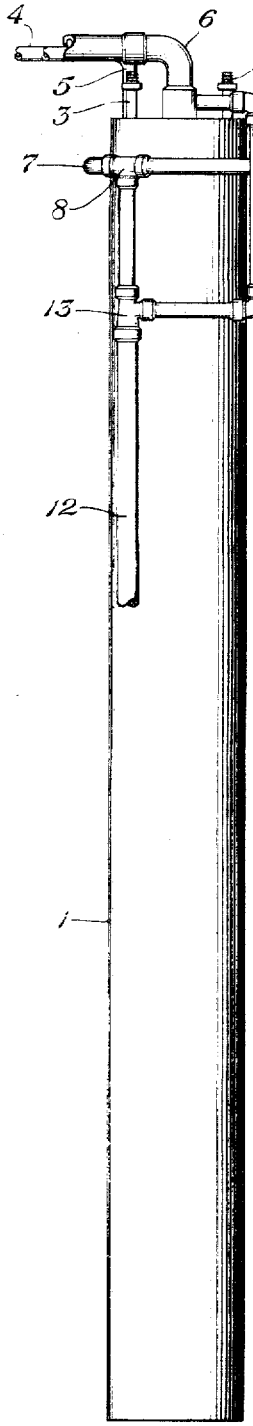
FIG. 1 is an elevation view of a column evaporator embodying the principles of my invention.
Figure 2:
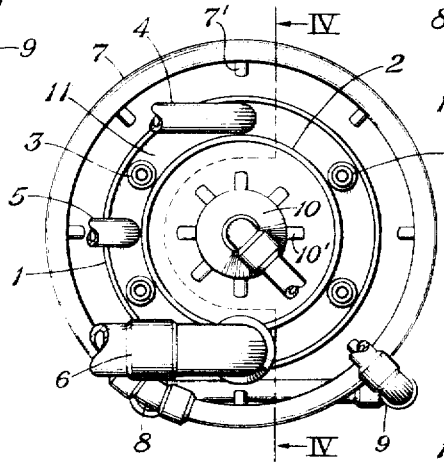
FIG. 2 is a plan view as seen from above the evaporator shown in FIG. 1.
Figure 3:
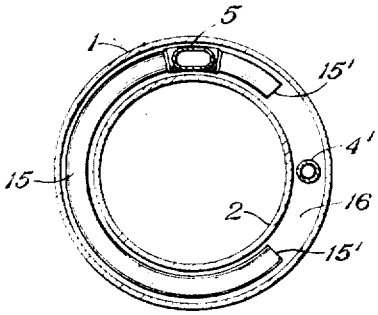
FIG. 3 is a cross-sectional view of the evaporator of FIGS. 1 and 2 as seen looking along the lines III—III of FIG. 4.

Disposed on the free end portion of the hot gas inlet 5 is a gas deflection element 15 which is utilized to direct the flow of hot gas against opposite sides of the discharge end portion 4' of the cold gas or refrigerant line 4. In this instance (see FIGS. 3 and 4) the gas deflection element is an annular ring having a section removed therefrom to define two substantially opposing ends 15' that discharge hot gas against opposite sides of the discharge end portion 4' of the refrigerant line 4.

A closure strip 16 is provided at the lower end of the inner and outer tubular members 1 and 2 as a convenient means to complete the formation of the above mentioned sealed evaporator chamber. The annular ring 15 is secured to the hot gas line 5 preferably by means of a "T" 17 which is disposed on end portion 5' and intermediate the opposing ends 15' of the annular ring 15. Thus, hot gas may flow freely from the opposing ends 15' of the annular ring 15 toward the discharge end 4' of the refrigerant line 4.

During the freezing cycle, a refrigerant or cold gas such as Freon after initially being compressed, is introduced into the evaporator chamber by means of the cold gas inlet 4. As the cold gas exits from the discharge end 4' of the cold gas inlet it expands into the evaporator chamber with a resulting reduction of temperature that cools both the inner and outer tubular members 1 and 2. Simultaneously and preferably by automatic means such as solenoid valves (not shown), water is sprayed onto the exterior surface of outer tubular member 1 by means of spray ring 7, and on the inner tubular member 2 by means of spray head 10. Since the spray ring and the spray head are disposed at the upper end of their respective tubular members, water flows down the tubular members and is transformed into ice while the members are cooled by the expansion of the refrigerant passing through the evaporator chamber.

After ice has formed to a predetermined thickness, the flow of cold refrigerant and the flow of water is stopped by the above mentioned solenoid valves while a third solenoid valve (not shown) opens to enable hot gas to enter the evaporator chamber through the hot gas inlet 5 for initiating the ice harvest cycle. Preferably, this hot gas is the Freon which was used as the refrigerant gas during the freezing cycle but which became warmed during its expansion through the evaporator chamber. Thus, the hot gas may be obtained from a location ahead of the heat exchanger (not shown) in the refrigeration system and is distributed through the hot gas inlet to the gas deflection means 15 formed on the lower end thereof. The flow of hot gas upwardly through the evaporator chamber and ultimately through the hot gas outlet 6 raises the temperature of the inner and outer tubular members, ultimately causing the ice to slip therefrom.

It should be apparent from the foregoing that I have provided an invention having significant advantages. The utilization of a column type evaporator in the manufacturing of ice is advantageous in that the ice harvest time can be significantly decreased. Whereas in previous such apparatus ice has tended to form unevenly along the surfaces of the inner and outer tubular members due to rapid expansion of the refrigerant as it leaves the discharge end of the cold gas inlet 4, it is now possible to obtain much more uniform ice thickness throughout the length of the evaporator. It is preferable that the ice have a uniform thickness of approxmiately one-quarter inch throughout the evaporator length, and the use of the gas deflection means to distribute the hot gas on discharge end of the cold gas or refrigerant inlet enables the ice to form more uniformly in about this thickness.

While I have shown my invention in only one of its forms it should be apparent to those skilled in the art that it is not so limited but is susceptible to various changes and modifications without departing from the spirit thereof.

I claim:

1. A vertical column evaporator for ice manufacturing machines, said evaporator comprising: an outer tubular member; an inner tubular member disposed inside said outer tubular member and being substantially coextensive therewith to define an elongated and sealed annular evaporator chamber therebetween; a refrigerant line extending through said evaporator chamber, with a discharge end portion terminating in a lower region thereof; a hot gas line also extending through said evaporator chamber, with its end portion terminating at the region of said chamber adjacent said discharge end of said refrigerant line; and gas deflection means carried by said hot gas line to direct the flow of hot gas against opposite sides of the discharge end portion of said refrigerant line to prevent excessive buildup of ice in this region during ice manufacturing cycles.

2. The evaporator defined by claim 1 wherein said deflection means comprises: an annular ring disposed on the end portion of said hot gas line, with a section removed therefrom to define two substantially opposing ends to discharge hot gas against opposite sides of the discharge end portion of said refrigerant line.

3. In a vertical column evaporator for ice manufacturing machines wherein said evaporator includes an outer tubular member and an inner tubular member disposed inside said outer tubular member to be substantially coextensive therewith to define an elongated and sealed annular evaporator chamber therebetween, the improvement which comprises: a refrigerant line extending through said evaporator chamber with a discharge end portion terminating in a lower region thereof; a hot gas line also extending through said evaporator chamber with its end portion terminating at the region of said chamber adjacent said discharge end of said refrigerant line; and a gas deflection element carried by said hot gas line to direct the flow of hot gas against opposite sides of the discharge end portion of said refrigerant line to prevent excessive buildup of ice in this region during ice manufacturing cycles.

4. The evaporator defined by claim 3 wherein said deflection element comprises: an annular ring disposed on the end portion of said hot gas line, with a section removed therefrom to define two substantially opposing ends to discharge hot gas against opposite sides of the discharge end portion of said refrigerant line.

*5. A vertical column evaporator for ice manufacturing machines, said evaporator comprising: an outer tubular member; an inner tubular member disposed inside said outer tubular member and being substantially coextensive therewith to define an elongated and sealed annular evaporator chamber therebetween; a refrigerant line extending through said evaporator chamber, with a discharge end portion terminating in a lower region thereof; a hot gas line also extending through said evaporator chamber, with its end portion terminating at the region of said chamber adjacent said discharge end of said refrigerant line; a gas outlet connected with an upper region of said chamber to facilitate circulation of hot gas up-*

*wardly along the length of the refrigerant line during ice harvesting.*

*6. In a vertical column evaporator for ice manufacturing machines wherein said evaporator includes an outer tubular member and an inner tubular member disposed inside said outer tubular member to be substantially coextensive therewith to define an elongated and sealed annular evaporator chamber therebetween, the improvement which comprises: a refrigerant line extending through said evaporator chamber with a discharge end portion terminating in a lower region thereof; a hot gas line also extending through said evaporator chamber with its end portion terminating at the region of said chamber adjacent said discharge end of said refrigerant line; a gas outlet connected with an upper region of said chamber to facilitate circulation of hot gas upwardly along the length of the refrigerant line during ice harvesting.*

References Cited

The following references, cited by the Examiner, are of record in the patented file of this patent or the original patent.

UNITED STATES PATENTS

| | | | |
|---|---|---|---|
| 3,146,610 | 9/1964 | Lowe | 62—352 |
| 3,280,585 | 10/1966 | Lowe | 62—352 |
| 1,866,192 | 7/1932 | Comer | 62—298 X |
| 3,034,310 | 5/1962 | Lowe | 62—352 X |
| 3,053,058 | 9/1962 | Kocher | 62—352 X |
| 3,146,610 | 9/1964 | Lowe | 62—352 X |

LLOYD L. KING, Primary Examiner